UNITED STATES PATENT OFFICE.

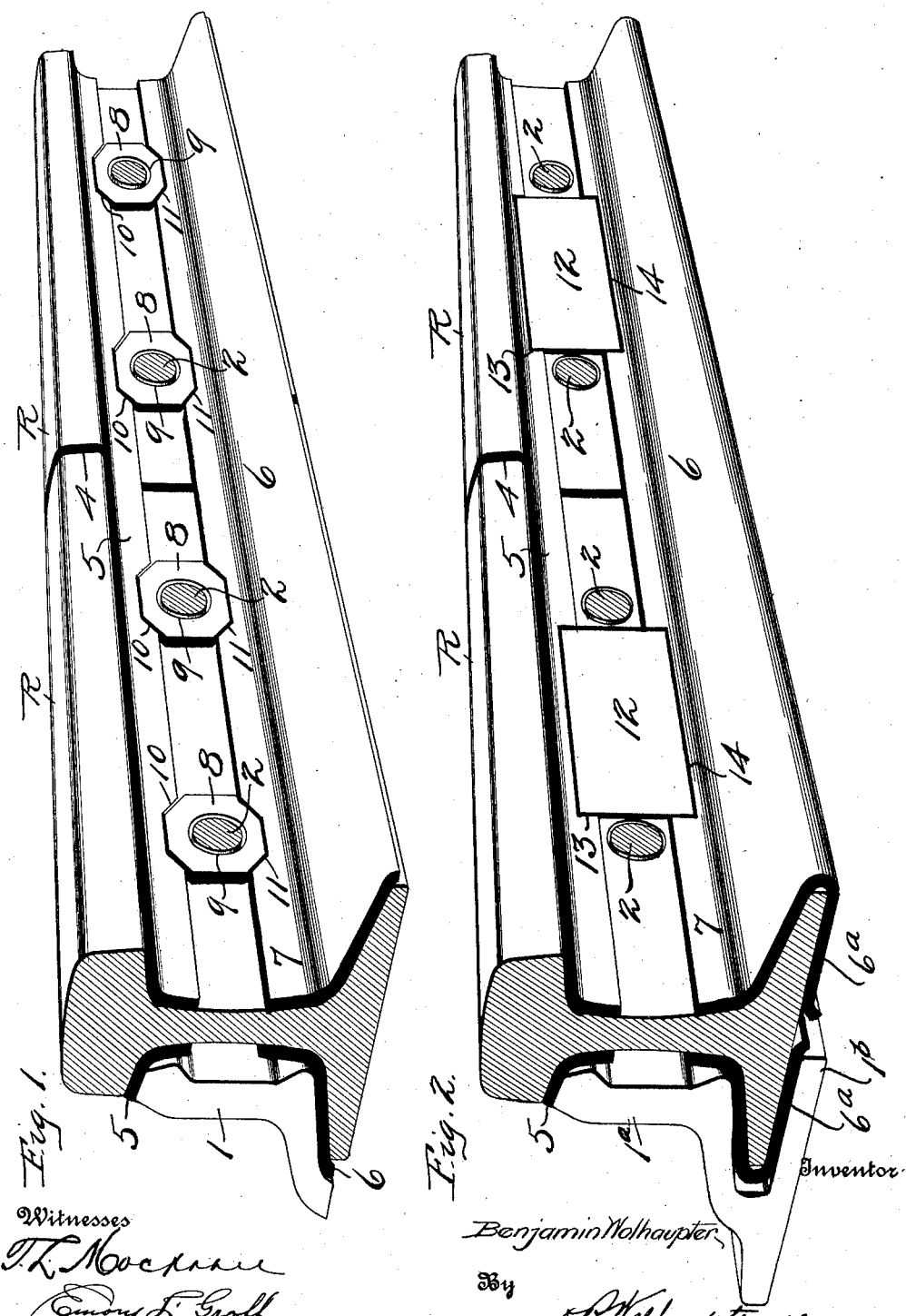

BENJAMIN WOLHAUPTER, OF NEW ROCHELLE, NEW YORK, ASSIGNOR TO THE RAIL JOINT COMPANY, OF NEW YORK, N. Y., A CORPORATION OF NEW YORK.

MEANS FOR INSULATING RAIL-JOINTS.

1,034,181.      Specification of Letters Patent.     Patented July 30, 1912.

Application filed April 5, 1912. Serial No. 688,778.

*To all whom it may concern:*

Be it known that I, BENJAMIN WOLHAUPTER, a citizen of the United States, residing at New Rochelle, in the county of Westchester and State of New York, have invented certain new and useful Improvements in Means for Insulating Rail-Joints, of which the following is a specification.

This invention relates to insulation for rail joints of the insulated type, and more particularly to that character of rail-joint insulation known as " divided-fiber ", wherein the insulation is in two parts, respectively for the head and base flange portions of the rails, whereby a minimum amount of insulating material may be used to the best advantage both electrically and mechanically, and admitting of the ready removal and replacing of worn-out pieces of insulation without disturbing or affecting the remaining good or unworn insulation.

The object of the present invention is to provide novel and practical means for effecting a locking in place of the separate pieces or sections of insulation in order to secure them against relative displacement or creeping under load conditions imposed thereon, thus contributing to the life of the insulation and maintaining its proper insulating relation to the rails and to the joint bars.

To this end, the present invention contemplates an improved means for interlocking the separate pieces or sections of two-part insulation for rail joints, primarily by an indirect interlock between the two through the use of interposed instrumentalities.

With these and many other objects in view which will more readily appear as the details of the invention are fully understood, the same consists in the novel construction, combination, and arrangement of parts hereinafter more fully described, illustrated and claimed.

Though susceptible of embodiment in various types of rail joints, and adaptable for use with any form of joint bar or splice that may be employed in an insulated rail joint, a few practical embodiments of the invention are shown for illustrative purposes in the accompanying drawings, in which—

Figure 1 of the drawings is a perspective view of an insulated rail joint provided with insulation constructed and arranged in accordance with the present invention, the view omitting one of the side joint bars to fully expose the novel insulation fastening means. Fig. 2 is a similar view showing a modification that may be resorted to in the form and arrangement of the interposed locking elements between the two sections of insulation; the view also illustrating the invention as employed in connection with joint bars of the continuous type, thereby illustrating the adaptability of the improvements to various kinds of rail joints and joint bars.

Like references designate corresponding parts in the several figures of the drawings.

The improved insulation expedients forming the subject matter of this application are intended to be applicable to various kinds of rail joints, and hence available for use with fish plates, plain angle bars, angle bars of the continuous type, channel bars, or any of the divers forms of splices which connect the rails and extend across the joint between them. In all of its applications, the invention possesses the same utility and subserves the same functions.

As above indicated, the present invention relates to novel means for interlocking the two sections or pieces of divided-insulation for rail joints. This divided-insulation is usually in two parts, respectively for the head and base flange portions of the rails. These separate sections are separately renewable and replaceable, and by way of illustrating the application of my invention thereto, reference is first made to Fig. 1 of the drawings, wherein is shown an insulated rail joint including the rails R, R, side joint bars 1, the usual joint bolts 2 which are insulated from the joint bars by any of the approved and well known bolt insulating expedients (not appearing in the present drawings), an insulating end post 4 between the rail ends, and divided or two-part side insulation between the rails and the joint bars, said insulation comprising an upper head section 5, and a lower base section 6. The sections of insulation 5 and 6 are made of the usual fiber sheets, or other well known insulating material, and each of the same may extend the entire length of the joint, or be of less extent without affecting the improvements claimed herein. As plainly shown in Fig. 1, the head section of insulation 5 is arranged above the line of joint bolts 2 and occupies an insulating position between the under side of the rail heads and the bearing head of the adjoining joint bar, while the lower or base section of insulation 6 is arranged over the base flange of the rails between the latter and the foot flange of the joint bar 1, said base section of insulation 6 also including at its inner edge an upstanding flange portion 7 arranged next to the webs of the rails to effectually insulate the bottom inside corners of the joint bars from the rails.

A distinctive feature of the present invention resides in providing an indirect interlock between the head and base sections of the insulation 5 and 6, so as to prevent relative longitudinal displacement of said two sections, or downward displacement of the head section of insulation. Various expedients may be utilized for accomplishing this desirable result. For instance, as suggested in Fig. 1 of the drawings, the separate interposed locking elements 8 are interposed between the two sections of insulation. These locking elements may be of any preferred or practical design and may be made of metal, fiber, or other suitable or available material without affecting the invention, and in their application as shown in Fig. 1 of the drawings, the same are illustrated as being in the form of washers having bolt openings 9 so that they may be placed over the joint bolts 2. These interposed locking elements or washers 8 are thus held, by the joint bolts, against longitudinal or vertical displacement, and the portions of said locking elements or washers which project respectively above and below the joint bolts are adapted to respectively engage in, and lock with, keeper sockets or notches 10 and 11 which are provided in the inner edges of the head and base sections of insulation 5 and 6. This construction provides simple, effectual and comparatively inexpensive means for locking the two sections of insulation against longitudinal movement or creeping without interfering in the least with the usual functions of divided-fiber insulation to permit of ready renewal and replacing of worn parts.

By way of illustrating the range of modification that may be resorted to in carrying out the present invention, there is shown in Fig. 2 of the drawings, a construction wherein the separate interposed locking elements, designated 12, are in the form of washer plates which occupy the space between pairs of joint bolts, and hence are adapted to have a stop engagement with such bolts to prevent longitudinal movement thereof. In this modification of the invention, the interposed elements 12 also are adapted to engage in and interlock with keeper sockets or notches 13 and 14 which are respectively provided in the inner edges of the head and base sections of insulation 5 and 6. Furthermore, in Fig. 2 of the drawings, the adaptability of the improvements to various kinds of joints and joint bars is exemplified by showing the same embodied in a rail joint including a joint bar 1ª of the well known continuous type. To adapt the invention to the continuous type of joint bar, the base section of insulation 6 is provided with a bottom piece or member 6ª that is interposed between the bottom of the rails and the rail supporting base plate 1ᵇ of the joint bar.

Various other modifications, and various changes in the form, proportion and minor details of construction may be resorted to without departing from the spirit or sacrificing any of the advantages of the invention.

I claim:

1. In an insulated rail joint, the combination with the rails and the splices therefor, of separate head and base sections of insulation, and separate means for interlocking the two sections of insulation.

2. In an insulated rail joint, the combination with the rails and the splices therefor, of separate head and base sections of insulation, and separate interposed means for interlocking the two sections of insulation.

3. In an insulated rail joint, the combination with the rails and the splices therefor, of separate head and base sections of insulation having an indirect interlocking connection therebetween.

4. In an insulated rail joint, the combination with the rails and the splices therefor, of separate head and base sections of insulation having an indirect separable interlocking connection therebetween.

5. In an insulated rail joint, the combination with the rails and the splices therefor, of separate head and base sections of insulation, and means for indirectly interlocking the two sections of insulation and for preventing longitudinal movement thereof.

6. In an insulated rail joint, the combination with the rails and the splices therefor, of separate head and base sections of insulation, and separate interposed means for indirectly interlocking the two sections of insulation and for preventing longitudinal movement thereof.

7. In an insulated rail joint, the combination with the rails and the splices therefor, of separate head and base sections of insulation, and separate means for separably interlocking the two sections of insulation, said means coöperating with the joint bolts to arrest longitudinal movement.

8. In an insulated rail joint, the combination with the rails and the splices therefor, of separate head and base sections of insulation having an indirect separable interlocking connection therebetween, said connection coöperating with the joint bolts to arrest longitudinal movement.

9. In an insulated rail joint, the combination with the rails and the splices therefor, of separate head and base sections of insulation, and washers interposed between and interlocking with the two sections of insulation.

10. In an insulated rail joint, the combination with the rails and the splices therefor, of separate head and base sections of insulation, and bolt-engaging washers interposed between and interlocking with the two sections of insulation.

11. In an insulated rail joint, the combination with the rails and the splices therefor, of separate head and base sections of insulation having keeper sockets, and washers interposed between the two sections of insulation and engaging the said sockets thereof.

12. In an insulated rail joint, the combination with the rails and the splices therefor, of separate head and base sections of insulation, and washers interposed between the two sections of insulation, said washers having bolt-receiving holes for the joint bolts and separably interlocking with the two sections of insulation.

In testimony whereof I hereunto affix my signature in the presence of two witnesses.

BENJAMIN WOLHAUPTER.

Witnesses:
   E. F. SCHERMERHORN,
   K. McNALLY.

Copies of this patent may be obtained for five cents each, by addressing the "Commissioner of Patents, Washington, D. C."